Figure 1:
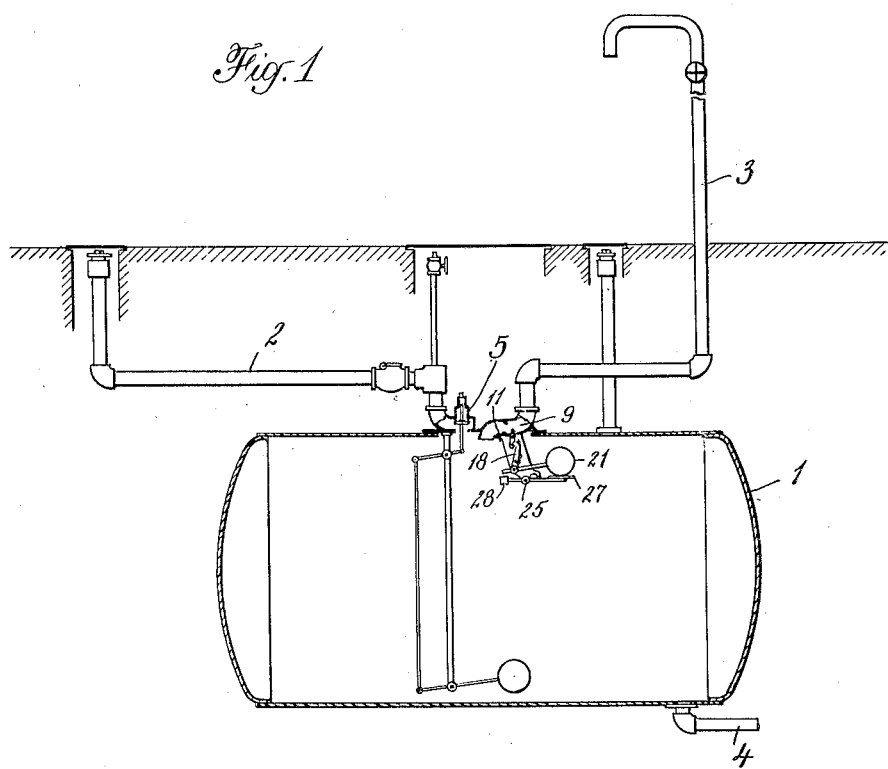

April 27, 1926.  
W. J. PETER  
1,582,302  
AUTOMATIC OUTLET CHECK VALVE FOR HYDRAULIC OIL DISPENSING SYSTEMS  
Filed April 23, 1925

INVENTOR
William J. Peter
BY
Pennie, Davis, Marvin & Edmonds
his ATTORNEYS

Patented Apr. 27, 1926.

1,582,302

UNITED STATES PATENT OFFICE.

WILLIAM J. PETER, OF NEW YORK, N. Y.

AUTOMATIC OUTLET CHECK VALVE FOR HYDRAULIC OIL-DISPENSING SYSTEMS.

Application filed April 23, 1925. Serial No. 25,361.

*To all whom it may concern:*

Be it known that I, WILLIAM J. PETER, a citizen of the United States, residing at New York city, New York, in the county of Bronx, State of New York, have invented certain new and useful Improvements in Automatic Outlet Check Valves for Hydraulic Oil-Dispensing Systems; and I do hereby declare the following to be a full, clear, and exact description of the invention, such as will enable others skilled in the art to which it appertains to make and use the same.

This invention relates to hydraulic systems for storing, handling and delivering oil and more particularly to means for preventing the delivery of water with oil.

In my co-pending application, Serial No. 18,782 filed March 27, 1925, I have illustrated and described an improved float valve mechanism for automatically closing the oil delivery pipe before water can enter it, the float valve mechanism being so constructed and designed that the normal passage of liquid through the delivery pipe will not act on the valve, and so that as soon as the water reaches a level in approximation to the outlet the valve is automatically closed. In order to guard against an accidental derangement of the system due to the float's springing a leak and failing to function properly when the water level reaches it, I have shown and described in my co-pending application a small receptacle adjacent the float and always filled with water in which the float is supported. Should the float spring a leak, it will sink within this small body of water and by operating an intermediate lever close the outlet valve so that in no event can water pass out through the oil discharge outlet. This arrangement works satisfactorily for most installations and under most conditions, but it sometimes happens in bitterly cold weather that the gasoline introduced into the tank is below the freezing temperature of water with the result that this small body of water in which the float is normally supported may freeze and temporarily, at least, prevent the proper functioning of the cut-off mechanism.

It is the object of the present invention to provide an improved cut-off unit which shall function independently of the temperature. I attain this object by replacing the small water receptacle of my co-pending application with a nicely balanced support for the float so designed that it will support the float in oil as long as the float is intact, but will permit it to drop as soon as leakage overcomes the slight differential necessary to enable the float to rise in water and sink in oil.

In the accompanying drawings I have illustrated, more or less diagrammatically, a preferred embodiment of my invention to which I shall now refer. In these drawings, Figure 1 is an elevation partly in section of a hydraulic system equipped with the automatic cut-off mechanism of the present invention, some of the elements of the system having no bearing on the present invention being omitted, and Figure 2 is an enlarged detail of the cut-off mechanism itself.

Figure 2:
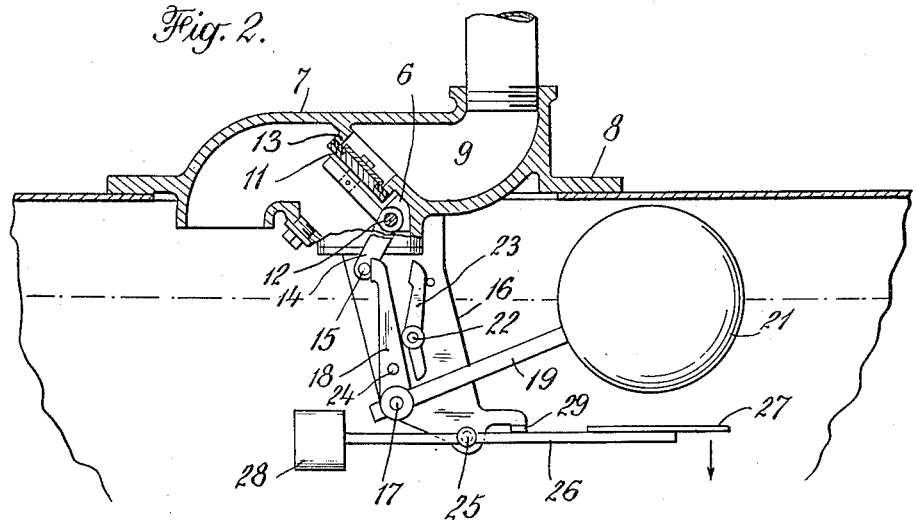

As illustrated in Figure 1, the storage tank is indicated by reference numeral 1. The oil is introduced through a pipe 2 and discharged through a riser pipe 3. The water is introduced and discharged through a pipe 4. By forcing water into the tank through pipe 4 oil is forced out through riser 3. The inflow of oil is controlled by a float-operated valve 5 and its discharge by a float-operated valve 6. As described in my co-pending application above referred to, the oil riser 3 enters the tank through a valve-housing 7 which is mounted upon and forms an integral part of a manhole cover 8, adapted to fit the standard manhole of oil tanks of this type. This housing is provided with a horizontal passageway 9 along the bottom of which the valve 11 is pivotally mounted upon a pin 12. When in open position this valve lies horizontally along the bottom of the passageway 9 out of the path of flow and when closed is swung upward against a diagonally disposed seat 13 which extends across the passageway 9. The valve is swung into closed position by means of an arm 14 secured to one end of the pin 12 and provided at its lower end with a pin 15 which extends on either side of the arm.

Depending from the manhole cover 8 is a bracket 16 at the lower end of which a lever 18 is journalled on a pin 17. This lever is provided at its lower end with an aperture through which the stem 19 of a float 21 is passed and adjustably held by means of a setscrew not shown, the arrangement of the parts being such that the lever 18 and the float 21 are pivotally mounted as a unit on the lower end of the bracket 16. The upper end of the lever 18 is adapted to engage one end of the pin 15 so that upward movement of the float will cause the lever 18 to strike pin 15 and close the valve. The float is designed to sink in oil and float in water.

Pivotally mounted at 22 upon the inner face of the bracket 16 is a second lever 23 the upper end of which is designed to contact with one end of pin 15, and the lower end with pin 24 on the lever 18 so that when the float moves downward, the pin 24 acting through lever 23 acts to close the valve. The valve-closing mechanism just described is identical in construction and operation with that illustrated and described in my copending application.

I shall now describe the improved safety float supporting element of the present invention which takes the place of the small water receptacle of the earlier application. Pivoted at 25 upon the lower end of the bracket 16 is an arm 26 carrying at one end a float 27 designed to support the float when immersed in oil, and the other end with a counterweight 28 so positioned as just to counter-balance the downward thrust of the float during normal operation. A stop 29 prevents upward movement of plate 27. As long as the tank is filled with oil the float will remain upon the float 27 supported in substantially horizontal position, the valve 11 will be open and oil may be discharged freely to passage 9 and pipe 3. As soon, however, as the water level reaches the float the latter rises with the water and, through the lever 18, swings the valve across the passage 9. The flow of the oil thereupon immediately seats it, thus cutting off further discharge and announcing to the operator that the tank is filled with water and must be refilled with oil. This is the normal operation. Should, however, the float spring a leak and overcome the counterbalancing effect of the weight 28, the pin 24 acting through lever 23 will also swing the valve 11 into closing position.

The mechanism of the present invention is not only effective in normal operation but acts automatically to cut off the flow of liquid in the event of leakage of the float, and is moreover weather-proof.

I claim:

1. Discharge control valve mechanism for oil tanks comprising the combination of a valve, a float, means operated by the float for closing the valve as the float rises, other means operated by the float for closing the valve as the float sinks and a balanced support for the float preventing its sinking during normal operation.

2. Discharge control valve mechanism for oil tanks comprising the combination of a valve, a float, means operated by the float for closing the valve as the float rises, other means operated by the float for closing the valve as the float sinks and a counterbalanced lever for supporting the float in intermediate position during normal operation, but so designed as to permit the float to sink should it spring a leak.

3. In a hydraulic oil storage and delivery system, the combination of a tank, an oil discharge pipe near the top of the tank, means for forcing water into the tank to force the oil out, a valve in the oil discharge pipe, a float designed to sink in oil and to float in water, means controlled by the float to close the valve when the float either rises or falls and a balanced support counteracting the downward thrust of the float during normal operation but insufficient to counteract it should the float spring a leak.

In testimony whereof I affix my signature.

WILLIAM J. PETER.